(12) United States Patent
Hirose et al.

(10) Patent No.: US 9,163,748 B2
(45) Date of Patent: Oct. 20, 2015

(54) FLUID CONTROL DEVICE AND FLOW RATE CONTROL APPARATUS

(75) Inventors: Takashi Hirose, Osaka (JP); Hiroshi Ogawa, Osaka (JP); Toshihide Yoshida, Osaka (JP); Kohei Shigyou, Osaka (JP)

(73) Assignee: FUJIKIN INCORPORATED, Osaka-shi (JP)

( * ) Notice: Subject to any disclaimer, the term of this patent is extended or adjusted under 35 U.S.C. 154(b) by 605 days.

(21) Appl. No.: 13/522,536

(22) PCT Filed: Nov. 25, 2010

(86) PCT No.: PCT/JP2010/070984
§ 371 (c)(1),
(2), (4) Date: Sep. 14, 2012

(87) PCT Pub. No.: WO2011/092929
PCT Pub. Date: Aug. 4, 2011

(65) Prior Publication Data
US 2013/0001453 A1    Jan. 3, 2013

(30) Foreign Application Priority Data
Jan. 26, 2010    (JP) .................. 2010-013994

(51) Int. Cl.
*F16K 31/02*   (2006.01)
*F16K 31/124*  (2006.01)
(Continued)

(52) U.S. Cl.
CPC ........... *F16K 31/124* (2013.01); *F16K 31/1226* (2013.01); *F16K 37/0066* (2013.01); *G05D 7/0635* (2013.01)

(58) Field of Classification Search
CPC ....... G05D 7/0652; F16K 1/523; F16K 1/526; Y10T 74/18056; Y10T 74/18688; Y10T 74/18312; Y10T 74/20504; Y10T 403/5781; Y10T 403/7064; Y10T 137/7759; Y10T 137/776; Y10T 137/87265; Y10T 137/87306; Y10T 137/87499; Y10T 137/87507; Y10T 137/0379

USPC ................. 137/12, 486, 487, 599.01, 599.06, 137/599.07, 613, 614; 251/284, 285
See application file for complete search history.

(56) References Cited

U.S. PATENT DOCUMENTS 3,074,686 A *  1/1963  Cain ......................... 251/129.2
3,253,612 A *  5/1966  Curatola et al. .............. 137/553
(Continued)

FOREIGN PATENT DOCUMENTS

DE    3432953 A1   3/1986
EP    1498648 A1   1/2005
(Continued)

OTHER PUBLICATIONS

International Search Report dated Dec. 21, 2010, issued for PCT/JP2010/070984.
(Continued)

*Primary Examiner* — John K Fristoe, Jr.
*Assistant Examiner* — Minh Le
(74) *Attorney, Agent, or Firm* — Locke Lord LLP; James E. Armstrong, IV

(57) ABSTRACT

This invention provides a fluid control device capable of making compact a fluid control device in which a valve and a limit switch are combined. A valve 6 includes a piston 26 as a moving member which includes a protruding portion protruding from an opening of a casing 21, and which linearly moves according to opening and closing of the valve 6 so as to abut against a limit switch 7. The limit switch 7 is made to face the piston 26 and is attached via a limit switch positioning unit 8 so as to be adjustable about its position. The limit switch positioning unit 8 includes a first bolt 42 fixed to a body 2, a second bolt 43 fixed to the limit switch 7, and a connection screw 44 which connects both the bolts 42, 43. The first bolt 42 and the second bolt 43 have different pitches from each other.

8 Claims, 3 Drawing Sheets

(51) Int. Cl.
*F16K 31/122* (2006.01)
*F16K 37/00* (2006.01)
*G05D 7/06* (2006.01)

(56) References Cited

U.S. PATENT DOCUMENTS

| | | | | |
|---|---|---|---|---|
| 3,565,089 | A * | 2/1971 | Thompson | 137/68.16 |
| 3,712,587 | A * | 1/1973 | Specht | 251/285 |
| 4,030,523 | A * | 6/1977 | Cram et al. | 137/599.07 |
| 4,088,064 | A * | 5/1978 | Tsunemoto et al. | 92/13.6 |
| 4,801,051 | A * | 1/1989 | Lewis et al. | 222/309 |
| 4,884,720 | A * | 12/1989 | Whigham et al. | 222/54 |
| 6,196,523 | B1 * | 3/2001 | Miyata et al. | 251/276 |
| 6,585,226 | B2 * | 7/2003 | Fukano et al. | 251/28 |
| 6,994,312 | B2 * | 2/2006 | Pauer et al. | 251/129.18 |
| 6,997,202 | B2 * | 2/2006 | Olander | 137/2 |
| 7,059,584 | B2 * | 6/2006 | Balasubramanian | 251/264 |
| 7,090,190 | B2 * | 8/2006 | Yasue et al. | 251/63.5 |
| 7,337,805 | B2 * | 3/2008 | Brown et al. | 137/625.33 |
| 7,823,859 | B2 * | 11/2010 | Ejiri | 251/60 |
| 8,033,525 | B2 * | 10/2011 | Wingett et al. | 251/285 |
| 8,490,947 | B2 * | 7/2013 | Grewal | 251/285 |
| 2006/0197049 | A1 * | 9/2006 | Hamada et al. | 251/285 |
| 2010/0139775 | A1 * | 6/2010 | Ohmi et al. | 137/12 |

FOREIGN PATENT DOCUMENTS

| | | |
|---|---|---|
| GB | 2138108 A | 10/1984 |
| JP | 10-13522 Y1 | 9/1935 |
| JP | 40-28345 Y1 | 9/1965 |
| JP | 52-98067 U | 7/1977 |
| JP | 56-37772 U | 4/1981 |
| JP | 56-152310 U | 11/1981 |
| JP | 64-4906 U | 1/1989 |
| JP | 01-269706 A | 10/1989 |
| JP | 05-051964 U | 7/1993 |
| JP | 11-265216 A | 9/1999 |
| JP | 2007-004644 A | 1/2007 |

OTHER PUBLICATIONS

Official Letter dated Oct. 31, 2013, issued by the Korean Intellectual Property Office.

* cited by examiner

FLUID CONTROL DEVICE AND FLOW RATE CONTROL APPARATUS

TECHNICAL FIELD

The present invention relates to a fluid control device which is provided with a valve and a limit switch for detecting opening and closing states of the valve, and which is suitably used in an apparatus for controlling a flow rate, and to a flow rate control apparatus using such a fluid control device.

BACKGROUND ART

As a flow rate control apparatus to which this invention is directed, in Patent Literature 1, there is proposed an apparatus including a body in which a required fluid passage is formed, a control valve, a sensor and a selector valve attached to the body, a first orifice disposed at an outlet passage from the control valve, a second orifice disposed at an outlet passage from the selector valve, and a control unit. The flow rate is controlled at the first orifice when the selector valve is closed, and the flow rate is controlled at the second orifice when the selector valve is opened (range changeable-type flow rate control apparatus).
Patent Literature 1: Japanese Patent Application Laid-Open No.

SUMMARY OF THE INVENTION

Problems to be Solved by the Invention

For the selector valve in the flow rate control apparatus of the above-mentioned Patent Literature 1, its opening and closing states are preferably detected by a limit switch. When the limit switch is built in the valve, the configuration of the valve is made complicated and enlarged, and the positional adjustment of the limit switch is made difficult. Accordingly, it is preferable that the limit switch is disposed outside the valve, but, in this case, there is needed a space for disposing the limit switch. Thus, there is a problem about how the fluid control device, in which the valve and the limit switch are combined, can be made compact.

An object of this invention is to provide a fluid control device which is capable of making compact a fluid control device in which a valve and a limit switch are combined.

Means for Solving the Problems

A fluid control device according to this invention includes a valve which opens and closes a fluid passage, and a limit switch which detects an operation of the valve. The valve includes a moving member which has a portion protruded from an opening of a casing, and which linearly moves according to opening and closing of the valve so as to abut against the limit switch. The limit switch is made to face the moving member and attached so as to be adjustable about its position.

A limit switch on the market as it is can be used for the above-mentioned limit switch, thereby capable of detecting the opening and closing states of the valve with using a simple configuration. Then, when the limit switch is disposed, the moving member as a component of the valve has a protruding portion which protrudes from the opening of the casing, and the limit switch is made to face this moving member and attached so as to be adjustable about its position. With this, the limit switch can be disposed easily at a smaller space to be used so that the fluid control device, in which the valve and the limit switch are combined, can be made compact.

The valve is not limited to a specific valve, and usually, the valve is provided with a body in which a fluid passage is disposed, a casing disposed above the body, a valve body which opens and closes the fluid passage, a valve rod which moves upward and downward so as to move the valve body in an opening direction or a closing direction, and an actuator which drives the valve rod.

The moving member is, for example, a piston which is disposed at the upper end portion of the valve rod which opens and closes the fluid passage via the valve body by moving upward and downward. The moving member is not limited to this, and the moving member may be configured by the upper end portion of the valve rod which abuts against the limit switch in itself. Moreover, the moving member can be configured by a member which is separate from the piston and attached to the valve rod so as to abut against the limit switch.

This fluid control device can be suitably used as, for example, a selector valve in a flow rate control apparatus, but this is not the only case. The fluid control device can be used for various uses which require a valve having a limit switch for detecting opening and closing states of the valve.

The fluid control device preferably further includes a limit switch positioning unit.

Preferably, the limit switch positioning unit includes a first bolt fixed to the body of the valve, a second bolt fixed to the limit switch, and a connection screw having at one end a female screw portion to be screwed with the first bolt, and at other end a female screw portion to be screwed with the second bolt, respectively, so as to connect both the bolts. The first bolt and the second bolt preferably have different pitches from each other.

The axial direction of the bolt and the connection screw is parallel to the moving direction of the valve rod of the valve, and the limit switch positioning unit is disposed adjacent to the valve. Moreover, the first bolt and the second bolt have the same direction of screw (for example, both are the right-hand screws). According to this limit switch positioning unit, while the first bolt and the second bolt are prevented from rotating together, the connection screw is rotated so that the connection screw moves in the direction according to the screw alignment with the bolt having a larger pitch. However, the connection screw moves in the same direction with respect to the bolt having a smaller pitch so that the amount of change of the space between both ends of the limit switch positioning unit (the distance from the head of the first bolt to the head of the second bolt) corresponds to the quantity obtained by multiplying the difference of pitches between the first bolt and the second bolt and the rotation number of the connection rod. According to this, when the connection rod is rotated, the moving amount of the limit switch is a minimum amount according to the difference of pitches so that the limit switch can be accurately positioned.

The pitches can be easily made different from each other by changing the bolt diameters. Alternatively, the pitches can be made different from each other by providing a coarse pitch thread to one bolt, and providing a fine pitch thread to the other bolt, while the bolt diameters are set to be the same. Such bolts are commercially available, and even when the bolts are to be manufactured, they can be easily manufactured. When using not only a coarse pitch thread, but also a fine pitch thread, the required pitch difference can be obtained by using bolts according to standards.

For example, the first bolt includes a connected-side male thread portion which is screwed with the connection screw, a fixed-side male thread portion which is screwed with a female thread portion disposed at the body of the valve, and an engagement portion (for example, a hexagonal prism-shaped engagement portion) with which a tool is to be engaged. The second bolt includes a connected-side male thread portion which is screwed with the connection screw, a fixed-side male thread portion which is screwed with a female thread portion disposed at a limit switch (or a splicing fitting attached to the limit switch), and an engagement portion (for example, a hexagonal prism-shaped engagement portion) with which a tool is engaged. In this case, the difference of pitches between the first bolt and the second bolt means the difference of pitches between the connected-side male thread portion of the first bolt and the connected-side male thread portion of the second bolt. For example, one of the connected-side male thread portion of the first bolt and the connected-side male thread portion of the second bolt is formed by the coarse pitch thread of M4 (pitch 0.7), and the other is formed by the fine pitch thread of M3 (pitch 0.35). In this case, the moving amount of the limit switch when the connection rod is rotated in one revolution is as follows: 0.7-0.35=0.35 (mm).

Preferably, the limit switch positioning unit and the valve are fixed to each other such that there is disposed in the body of the valve a female thread portion corresponding to the fixed-side male thread portion of the first bolt, and the first bolt is screwed into the body of the valve. Moreover, preferably, the limit switch positioning unit and the limit switch are fixed to each other via a splicing fitting, and such a fixing is performed by disposing at the splicing fitting fixed to the limit switch by a screw etc. a female thread portion corresponding to the fixed-side male thread portion of the second bolt, and by screwing the second bolt into the splicing fitting.

The fixed-side male thread portions of the respective bolts may have the same pitch as that of the connected-side male thread portions, or may have a pitch different from that of the connected-side male thread portions. The fixed-side male thread portions of the respective bolts are configured to be attached to the body of the valve, or the limit switch. Both the connected-side and the fixed-side of the respective bolts are formed as the male thread portions so that the attachment configuration can be simplified. However, the fixed-side of the limit switch positioning unit is not limited to the male thread portions of the respective bolts, and may be female thread portions. Moreover, the limit switch positioning unit may be attached to the body of the valve and the limit switch by a suitable configuration without fastening by screws.

Preferably, the limit switch positioning unit includes a first lock nut which prevents the connection screw and the first bolt from relatively rotating, and a second lock nut which prevents the connection screw and the second bolt from relatively rotating.

By doing like this, the accurate positioning, which has been performed by the limit switch positioning unit, is prevented from being dislocated so that the reliability can be further enhanced.

The fluid control device according to this invention can be suitably used for a selector valve in a flow rate range changeable-type flow rate control apparatus. The flow rate range changeable-type flow rate control apparatus includes a body in which a required fluid passage is formed, a control valve, a sensor, and a selector valve with a limit switch, attached to the body, a first orifice disposed at an outlet passage from the control valve, a second orifice disposed at an outlet passage from the selector valve, and a control unit which controls a flow rate. The flow rate is controlled at the first orifice when the selector valve is closed, and the flow rate is controlled at the second orifice when the selector valve is opened. In such a flow rate control apparatus, the opening and closing states of the selector valve is preferably confirmed by the signal from the limit switch. Here, the opening degree of the selector valve is small so that a careful operation is required for positioning the limit switch, and the limit switch once positioned needs to be firmly fixed. Thus, in such a flow rate range changeable-type flow rate control apparatus, the above-mentioned fluid control device (i.e., the selector valve with the limit switch) is used as the selector valve with the limit switch disposed between the control valve and the orifice so that there can be obtained a flow rate control apparatus which is compact and is excellent in the accuracy of the flow rate control.

Needless to say, the use of the fluid control device according to this invention is not limited to the above-mentioned flow rate control apparatus.

Advantageous Effects of the Invention

According to the fluid control device of this invention, the valve includes a moving member which has the portion protruded from the opening of the casing, and which linearly moves according to opening and closing of the valve so as to abut against the limit switch. The limit switch is made to face the moving member and attached so as to be adjustable about its position so that the limit switch can be disposed easily at a smaller space to be used, and the fluid control device, in which the valve and the limit switch are combined, can be made compact.

Figure 1:
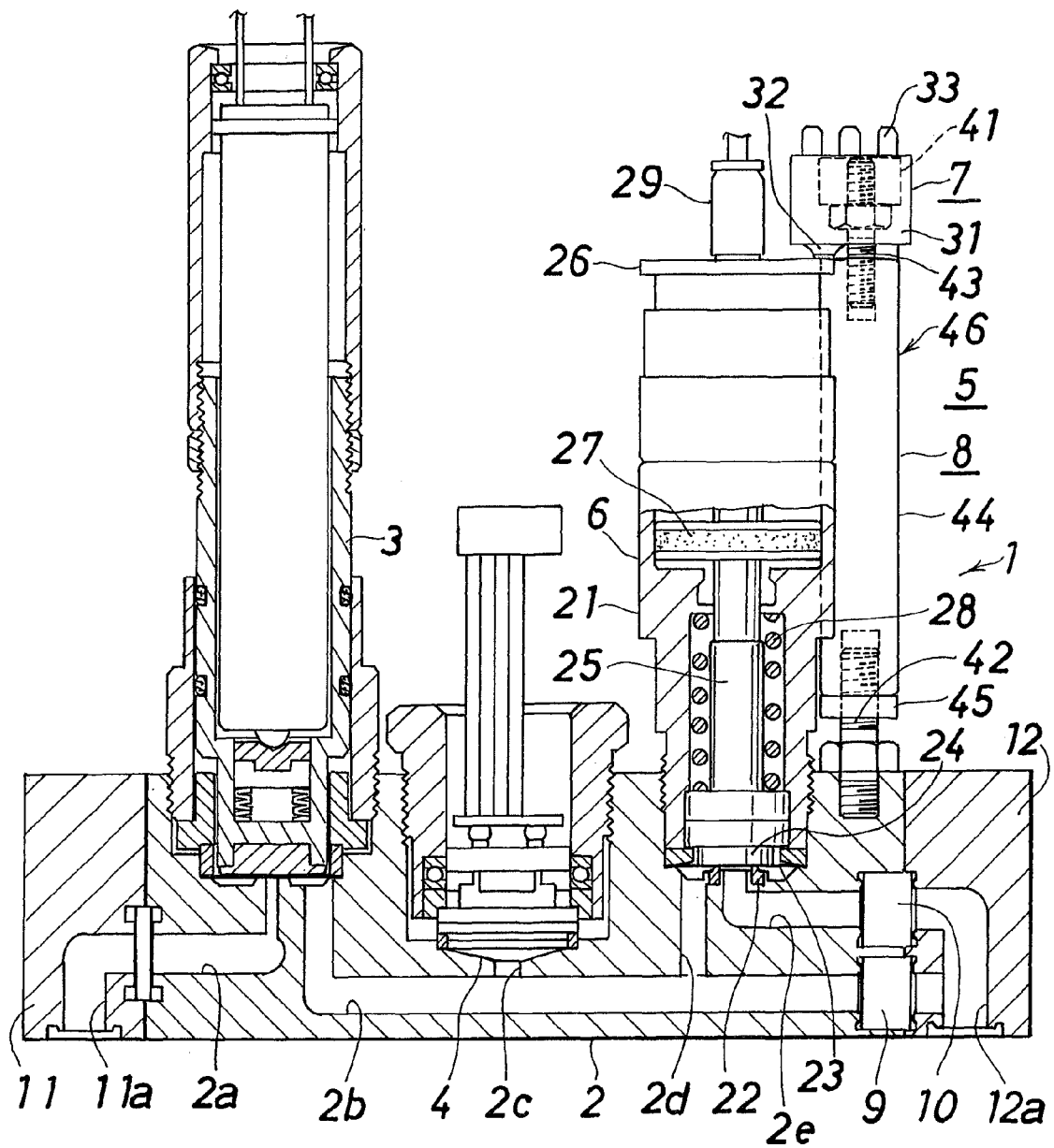
FIG. 1 is a front cross-sectional view illustrating a first embodiment of a flow rate control apparatus which uses a fluid control device according to this invention.

EXPLANATION OF REFERENCE SIGNS (1): flow rate control apparatus
(2): body
(3): control valve
(4): pressure sensor (sensor)
(5): fluid control device
(6): selector valve (valve)
(7): limit switch
(8): limit switch positioning unit
(9): first orifice
(10): second orifice
(21): casing
(23): diaphragm (valve body)
(25): valve rod
(26): first piston (moving member)
(29): piston driving unit
(42): first bolt
(43): second bolt
(44): connection screw
(44a), (44b): female thread portions
(45): first lock nut
(46): second lock nut

MODES FOR CARRYING OUT THE INVENTION

An embodiment of this invention is described with reference to the drawings hereunder. In the following descriptions, the terms of up and down, left and right, mean the up and down, the left and right on the sheet of FIG. 1.

FIG. 1 illustrates a part of the flow rate control apparatus which uses the fluid control device according to this invention.

The flow rate control apparatus (1) is pressure-type and flow rate range changeable-type, and includes a body (2) in which required flow passages (2a), (2b), (2c), (2d), (2e) are formed, a control valve (3), a pressure sensor (4) and a selector valve (6) with a limit switch (7), which are attached to the body (2), a control unit (not shown), a first orifice (9) which is disposed at an outlet passage (2b) from the control valve (3), and a second orifice (10) which is disposed at an outlet passage (2e) from the selector valve (6).

The control valve (3), the pressure sensor (4), and the selector valve (6) are arranged in this order from the left. There are disposed in the body (2) an inlet passage (2a) to the control valve (3), an outlet passage (2b) from the control valve (3), a connection passage (2c) which connects the outlet passage (2b) from the control valve (3) with the pressure sensor (4), a diverging passage (2d) which connects the outlet passage (2b) from the control valve (3) with the selector valve (6), and an outlet passage (2e) from the selector valve (6). The outlet passage (2b) from the control valve (3) and the outlet passage (2e) from the selector valve (6) are arranged in parallel, and the above-mentioned orifices (9), (10) are disposed at the outlet portions of the respective outlet passages (2b), (2e).

A passage block (11), in which an inlet passage (11a) communicating with the inlet passage (2a) to the control valve (3) is formed, is abutted against the left side of the body (2). A passage block (12), in which the outlet passage (2b) from the control valve (3), and an outlet passage (12a) communicating with the outlet passage (2e) from the selector valve (6) are formed, is abutted against the right side of the body (2).

According to this flow rate control apparatus (1), when the selector valve (6) is closed, the flow rate at the first orifice (9) is controlled, and when the selector valve (6) is opened, the flow rate at the second orifice (10) is controlled. The pressure on the upstream side of the orifices (9), (10) is measured by the pressure sensor (4), and while the flow rate passing through the orifices (9), (10) is calculated based on this pressure, the opening and closing amount of the control valve (3) is adjusted so as to control the flow rate passing through the orifices (9), (10).

With regard to the two orifices (9), (10), the orifice (10), which is disposed at the outlet passage (2e) from the selector valve (6), is for a large flow rate, and the orifice (9), which is disposed at the outlet passage (2b) from the control valve (3), is for a small flow rate. Accordingly, when the selector valve (6) is closed, the fluid is discharged only from the outlet passage (2b) from the control valve (3) so as to perform a control of small flow rate. When the selector valve (6) is opened, the fluid is discharged from both the outlet passage (2b) from the control valve (3) and the outlet passage 2e from the selector valve (6) so as to perform a control of large flow rate.

Thus, by a simple operation of opening and closing the selector valve (6), the flow rate controls by the large flow rate orifice (the second orifice) (10) and the small flow rate orifice (the first orifice) (9) are suitably combined so that an accurate flow rate control can be performed over a wide range of flow rate area.

The above-mentioned flow rate control apparatus (1) is characterized by the selector valve (6) with the limit switch (7), and the control valve (3), the pressure sensor (4), and the two orifices (9), (10) are publicly known. To dispose the selector valve (6) for switching the two orifices (9), (10) is also similar to the conventional one.

The selector valve (6) with the limit switch (7), namely the fluid control device (5), is described hereunder.

The fluid control device (5) includes the selector valve (6), the limit switch (7) which detects opening and closing states of the selector valve (6), and a limit switch positioning unit (8).

The selector valve (6) is a normally closed-type valve which is operated by air pressure, and is opened and closed by an electromagnetic valve which is operated by a signal from the control unit. The opening and closing states of this selector valve (6) are detected by the limit switch (7) and input into the control unit.

The selector valve (6) includes a casing (21) which is disposed above the body (2), an annular valve seat (22) which is disposed at the circumferential edge of the diverging passage (2d), a diaphragm (valve body) (23) which opens and closes the diverging passage (2d) by being pressed against the annular valve seat (22) or released from the same, a diaphragm pressing member (24) which presses the diaphragm (23) downward, a valve rod (25) which is disposed in the casing (21) and moves upward or downward so as to move the diaphragm (23) in the opening or closing direction, two (upper and lower) pistons which are disposed at the valve rod (25) (a first piston (26) at the upper side and a second piston (27) at the lower side), a compressed coil spring (elastic member) (28) which presses the valve rod (25) downward, and a piston driving unit (29) which drives the first and second pistons (26), (27).

The limit switch (7) is commercially available, and is configured by a main body (31), a detection portion (32), and a terminal portion (33). The limit switch is normally OFF, and is made ON when the moving member to be detected (here, the upper end portion of the first piston (26) mentioned above) abuts against the detection portion (32) so as to press and move the same upward. The limit switch (7) is made to face the upper surface of the first piston (26) which is exposed from the opening of the casing (21) so that the limit switch (7) is made ON when the first piston (26) moving together with the valve rod (25) abuts against the limit switch (7).

The limit switch positioning unit (8) is configured by a splicing fitting (41) which is attached to the limit switch (7), a first bolt (42) which is fixed to the body (2), a second bolt (43) which is fixed to the splicing fitting (41), a connection screw (44) which connects both the bolts (42), (43), a first lock nut (45) which prevents the connection screw (44) and the first bolt (42) from relatively rotating, and a second lock nut (46) which prevents the connection screw (44) and the second bolt (43) from relatively rotating.

Figure 2:
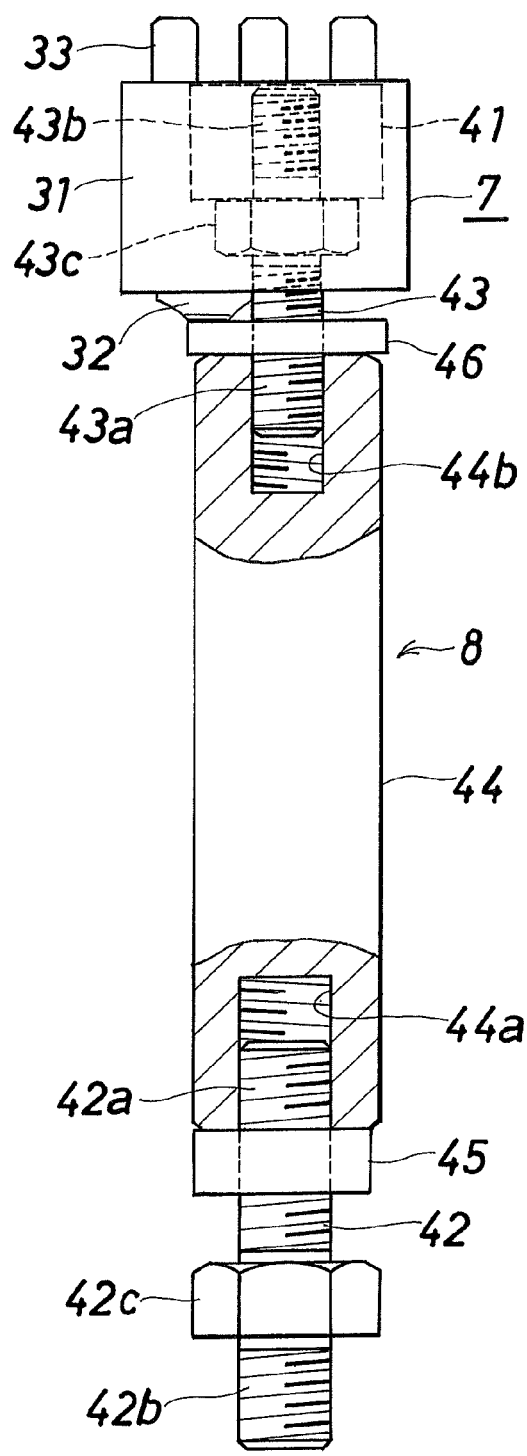
FIG. 2 is an enlarged front cross-sectional view of a limit switch positioning unit of the fluid control device according to this invention.
Figure 3:
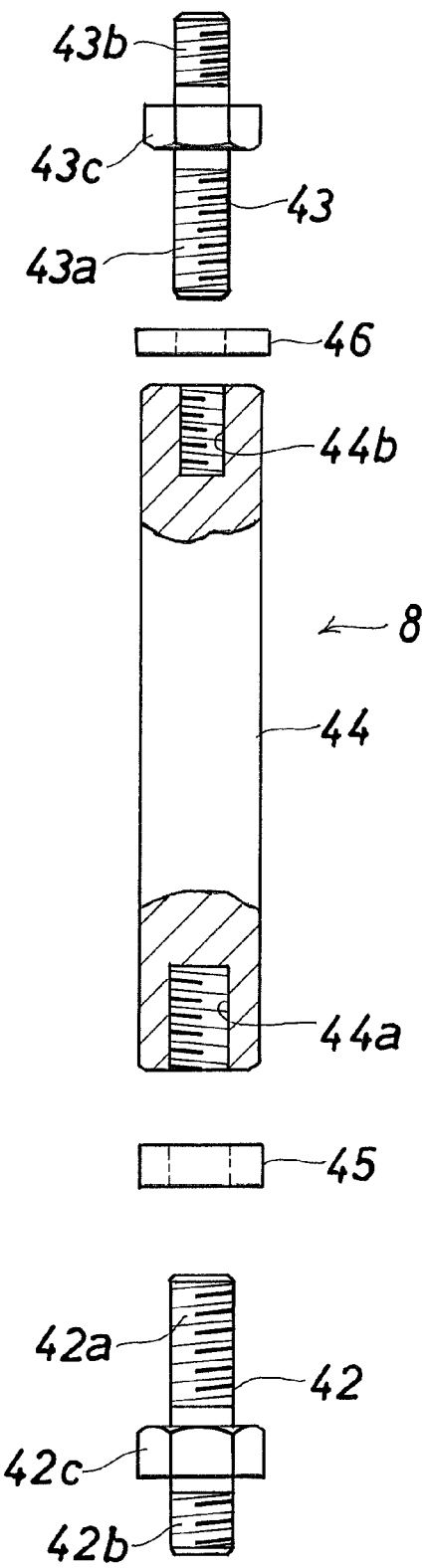
FIG. 3 is an exploded view of the limit switch positioning unit of the fluid control device according to this invention.

As illustrated in FIGS. 2 and 3 in detail, the connection screw (44) is provided at the lower end with a female thread portion (44a) which is screwed with the first bolt (42), and at the upper end with a female thread portion (44b) which is screwed with the second bolt (43), respectively. The first bolt (42) includes a connection-side male thread portion (42a) which is screwed with the connection screw (44), a fixed-side male thread portion (42b) which is screwed with the female thread portion disposed at the body (2), and an engagement portion (42c) having a hexagonal prism shape with which a tool is to be engaged. The second bolt (43) includes a connection-side male thread portion (43a) which is screwed with the connection screw (44), a fixed-side male thread portion (43b) which is screwed with the female thread portion disposed at the splicing fitting (41) of the limit switch (7), and an engagement portion (43c) having a hexagonal prism shape with which a tool is to be engaged.

The axial direction of the respective bolts (42), (43) and the connection screw (44) is parallel to the moving direction of the valve rod (25) of the selector valve (6) (namely, all of them are upward and downward directions), and the limit switch positioning unit (8) is disposed so as to substantially make contact with the selective valve (6).

Both the first bolt (42) and the second bolt (43) are the right-hand screws, but their pitches are made different from each other. Specifically, both the connection-side male thread portion (42a) and the fixed-side male thread portion (42b) of the first bolt (42) are formed by a coarse pitch thread of M4×0.7. The connection-side male thread portion (43a) of the second bolt (43) is formed by a fine pitch thread of M3×0.35. The fixed-side male thread portion (43b) of the second bolt (43) is formed by a coarse pitch thread of M3×0.5.

Then, the limit switch (7) is fixed to the second bolt (43) of M3 (pitch 0.35 mm) via the splicing fitting (41), and the second bolt (43) of M3 (pitch 0.35 mm) and the first bolt (42) of M4 (pitch 0.7 mm) are screwed into the connection screw (44). Accordingly, when the connection screw (44) is rotated, the limit switch (7) moves downward due to the difference of bolt pitches between M3 and M4 so that the position of the limit switch (7) can be adjusted. After this positional adjustment, the lock nuts (45), (46) are fastened so that the first bolt (42) and the second bolt (43) are prevented from rotating, and therefore the positional change of the limit switch (7) is prevented after that.

According to this limit switch positioning unit (8), under a state in which the lock nuts (45), (46) are loosened, and the first bolt (42) and the second bolt (43) are prevented from rotating together, when the connection screw (44) is rotated, the connection screw (44) moves in the direction according to the screw alignment with the first bolt (42) having the larger pitch. However, the connection screw (44) moves in the same direction with respect to the second bolt (43) having the smaller pitch so that the amount of change of the space between both ends of the limit switch positioning unit (8) (the distance from the bottom end of the first bolt (42) to the upper end of the second bolt (43)) corresponds to the quantity obtained by multiplying the difference of pitches (0.7-0.35) between the connection-side male thread portion (42a) of the first bolt (42) and the connection-side thread male portion (43a) of the second bolt (43) and the rotation number of the connection rod (44). Accordingly, when the connection rod (44) is rotated, the limit switch (7) moves according to the difference of pitches (0.7-0.35).

The limit switch positioning unit (8) is fixed to the body (2) when the connection-side male thread portion (42b) of the first bolt (42) is screwed with the body (2). Moreover, the limit switch positioning unit (8) is fixed to the limit switch (7) when the fixed-side male thread portion (43b) of the second bolt (43) is screwed with the splicing fitting (41) which is fixed to the limit switch (5) with a screw.

Figure 4:
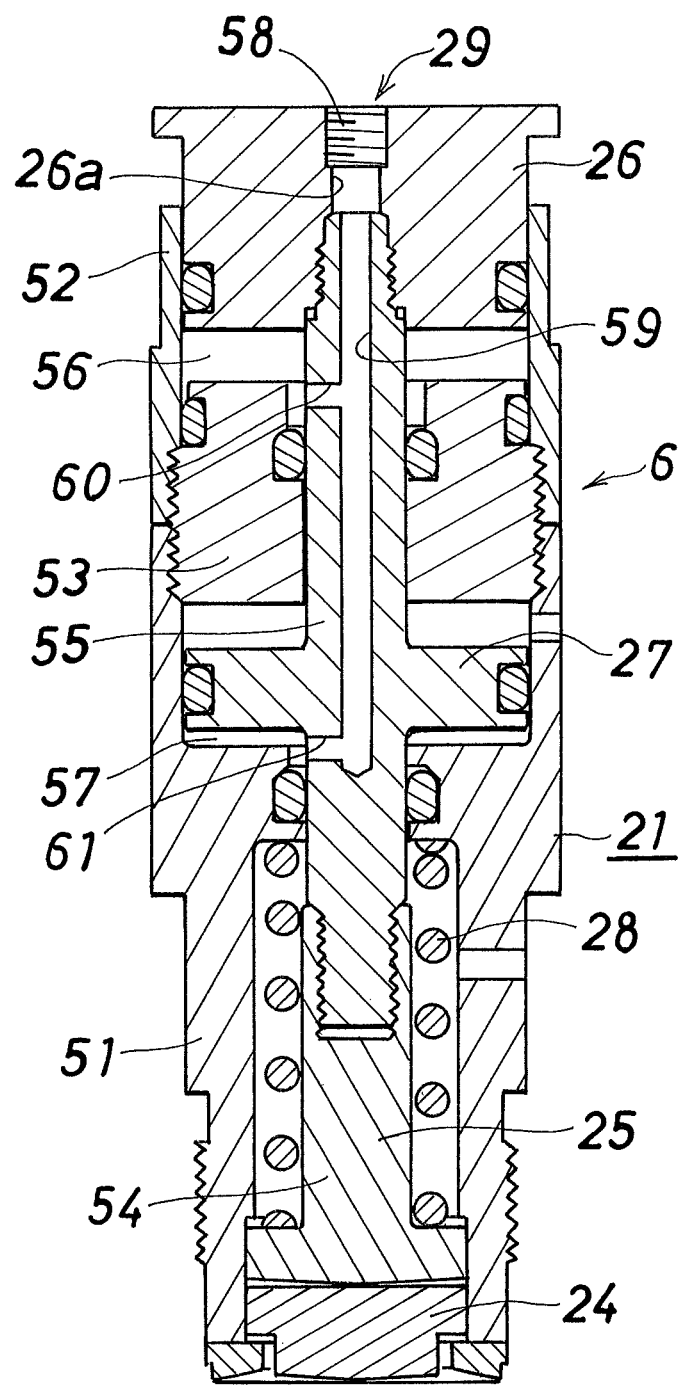
FIG. 4 is an enlarged front cross-sectional view of a valve of the fluid control device according to this invention.

In FIG. 4, a cross-sectional view of the selector valve (6) is illustrated, and the internal structure of the selector valve (6) is described with reference to this FIG. 4 hereunder.

The casing (21) includes a lower casing (51) which is screwed with the body (2) and fixed to the same, and an upper casing (52) which is combined with the lower casing (51) by a connector (53). The connector (53) is formed in a ring shape having a through hole into which the valve rod (25) is inserted so as to be vertically movable and fluid tightly, and a male thread is formed at its outer circumference. At the upper end portion of the lower casing (51) and the lower end portion of the upper casing (52), there are formed female thread portions which are screwed with the male thread portions of the connector (53). When the lower casing (51) is screwed with the connector (53) from the lower side, and the upper casing (52) is screwed with the connector (53) from the upper side, respectively, the lower casing (51) and the upper casing (52) are abutted against each other so as to be combined. With this, at the positions above and below the connector (53), there are respectively formed spaces in which the first piston (26) and the second piston (27) move. The first piston (26) is disposed in the upper casing (52) so as to be vertically movable such that its lower surface faces the upper surface of the connector (53). The second piston (27) is disposed in the lower casing (51) so as to be vertically movable such that its upper surface faces the lower surface of the connector (53).

The valve rod (25) is formed by two parts (a stem (54) and a stem piston (55)). The stem (54) includes a shaft portion where a female thread portion is disposed at its upper portion, and a flange portion which is disposed at the lower end portion of the shaft portion. The lower surface of the flange portion is abutted against the diaphragm pressing member (24). The stem piston (55) includes a shaft portion whose lower end portion is screwed with the shaft portion of the stem (54), and a flange portion which is integrally formed with the intermediate portion of the shaft. The flange portion of the stem piston (55) forms the second piston (27), and the combination of the stem (54) and the shaft of the stem piston (55) forms the valve rod (25).

The piston driving unit (29) is configured to apply driving gas to the respective pistons (26), (27) for moving the valve rod (25) upward, and therefore first and second driving gas introducing chambers (56), (57) are formed below the respective pistons (26), (27). The first driving gas introducing chamber (56) is formed between the first piston (26) and the connector (53), and the second driving gas introducing chamber (57) is formed between the second piston (27) and the inward flange portion of the lower casing (51). When the driving gas (compressed air) is introduced into the first and second driving gas introducing chambers (56), (57), force is applied upward to the first piston (26) and the second piston (27), thereby moving upward the valve rod (25). With this, in the flow rate control apparatus (1) illustrated in FIG. 1, the diverging passage (2d) becomes the opened state so that the fluid is sent to the outlet passage (2e).

The upper casing (52) is formed so as to be opened upward, and the first piston (26) is disposed at the upper end portion of the valve rod (25) such that the piston upper end portion is exposed from the opening of the upper casing (52) when the valve rod (25) is located at the upper position. Specifically, a male thread portion is disposed at the upper end portion of the valve rod (25) (the shaft portion of the stem piston (55)), and the through hole (26a) is disposed at the first piston (26). There is disposed at the lower portion of the through hole (26a) a female thread portion which is screwed with the upper end portion of the valve rod (25). The upper end portion of the valve rod (25) is inserted into the lower portion of the through hole (26a) of the first piston (26) and screwed with the same so as to combine the valve rod (25) and the first piston (26).

The upper portion of the through hole (26a) of the first piston (26) is formed as a driving gas introducing portion (58) with which a piping for introducing the driving gas can be connected. There are formed in the valve rod (25) an axial direction passage (59) which extends downward from the driving gas introducing portion (58), a radial direction passage (60) which communicates with the first driving gas introducing chamber (56) from the intermediate portion of the axial direction passage (59), and a radial direction passage (61) which communicates with the second driving gas introducing chamber (57) from the lower end portion of the axial direction passage (59). With this, the driving gas introducing portion (58) is single so that the driving gas flows into the respective driving gas introducing chambers (56), (57) from this driving gas introducing portion (58).

According to this selector valve (6), under a state in which the driving gas is not introduced into the respective driving gas introducing chambers (56), (57) of the selector valve (6) (the closed state of the selector valve (6)), the valve rod (25) is located at the closed position (lower position) by the biasing force of the compressed coil spring (28), and therefore the first piston (26) is located at the lower position. Accordingly, the limit switch (7) is OFF. When the driving gas is introduced into the respective driving gas introducing chambers (56), (57) (the opened state of the selector valve (6)), the valve rod (25) is moved upward against the biasing force of the compressed coil spring (28), and therefore, the first piston (26) moves to the upper position. As a result, the upper end of the first piston (26) abuts against the detection portion (32) of the limit switch (7) so that the opened state of the selector valve (6) is detected and sent to the control unit.

According to this flow rate control apparatus (1), the selector valve (6) disposed between the control valve (3) and the orifices (9), (10) is provided with the above-mentioned limit switch (7) or the like, the accuracy of flow rate control can be excellent, and the space for disposing the limit switch (7) is only the space for adding the vertically extending limit switch positioning unit (8) so that the configuration can be made compact. Moreover, the limit switch (7) is moved by the limit switch positioning unit (8) according to the pitch difference (0.7-0.35) so that the position of the limit switch (7) can be adjusted accurately. After adjusting the position of the limit switch (7), the movement of the limit switch (7) is prevented by the lock nuts (45), (46) so that the accurate positional adjustment of the limit switch (7) is maintained over a long period.

Note that as the flow rate control apparatus (1), other than the pressure type using the pressure sensor as mentioned above, there is a thermal type using a temperature sensor, and the above-mentioned fluid control device (5) can be applied to the thermal type.

Moreover, the above-mentioned fluid control device (5) can be used for a use other than the flow rate control apparatus, and for example, can be used as a component of a fluid control apparatus called an integrated fluid control apparatus which is used in a semiconductor manufacturing apparatus. In such a fluid control apparatus, an integration is advanced such that a plurality of lines, which are formed by connecting a plurality of linearly arranged fluid control equipments without piping or joint, are disposed on a base member in parallel. Accordingly, the fluid control apparatus is configured such that a plurality of block-shaped joint members constituting lower layers are attached to the base member by a male thread member, and a plurality of fluid control equipments constituting upper layers are attached so as to span the adjacent joint members. In such an integrated fluid control apparatus, a function similar to that of the body (2) of the above-mentioned flow rate control apparatus (1) can be applied to the main body or the passage block of its fluid control equipment (for example, an opening and closing valve) so that the above-mentioned limit switch positioning unit (8) can be easily attached.

Note that, the range in which the limit switch positioning unit (8) can be moved can be suitably set according to the size of the selector valve (6) and the moving amount of the first piston (26). The movable range can be enlarged by making longer the female thread portions (44a), (44b) of the connection screw (44) and the connection-side male thread portions (42a), (43a) of the first and second bolts (42), (43).

INDUSTRIAL APPLICABILITY

According to this invention, the limit switch, which detects the opening and closing states, is added to the valve, and the fluid control device, in which the valve and the limit switch are combined, can be made compact so as to be suitably used as the selector valve in the fluid control apparatus, and also be available for other various uses.

The invention claimed is:

1. A fluid control device comprising:
   a valve which opens and closes a fluid passage;
   a limit switch which detects an operation of the valve; and
   a limit switch positioning unit, wherein the limit switch positioning unit includes a first bolt fixed to the body of the valve, and a second bolt fixed to the limit switch, and a connection screw having at one end a female screw portion to be screwed with the first bolt, and at other end a female screw portion to be screwed with the second bolt, respectively, so as to connect both the bolts, and the first bolt and the second bolt have different pitches from each other, and
   wherein the valve includes a moving member which has a portion protruded from an opening of a casing, and which linearly moves according to opening and closing of the valve so as to abut against the limit switch, and the limit switch is made to face the moving member and attached so as to be adjustable about its position.

2. The fluid control device according to claim 1, wherein the limit switch positioning unit further includes a first lock nut which prevents the connection screw and the first bolt from relatively rotating, and a second lock nut which prevents the connection screw and the second bolt from relatively rotating.

3. The fluid control device according to claim 1,
   wherein the valve includes a body in which a fluid passage is disposed, a casing disposed above the body, a valve body which opens and closes the fluid passage, a valve rod which moves upward and downward so as to move the valve body in an opening direction or a closing direction, a piston disposed at the valve rod, and a piston driving unit which drives the piston, and the piston is disposed at an upper end portion of the valve rod such that a piston upper end portion is exposed from an opening of the casing when the valve rod is located at an upper position, the piston being used as a moving member which abuts against the limit switch.

4. A flow rate control apparatus, comprising:
   a body in which a required fluid passage is formed, a control valve, a sensor, and a selector valve with a limit switch, attached to the body, a first orifice disposed at an outlet passage from the control valve, a second orifice disposed at an outlet passage from the selector valve, and a control unit which controls a flow rate, the flow rate being controlled at the first orifice when the selector valve is closed, and the flow rate being controlled at the second orifice when the selector valve is opened,
   wherein the selector valve with the limit switch is the fluid control device according to claim 1 which is disposed between the control valve and the orifice.

5. The fluid control device according to claim 2, wherein the valve includes a body in which a fluid passage is disposed, a casing disposed above the body, a valve body which opens and closes the fluid passage, a valve rod which moves upward and downward so as to move the valve body in an opening direction or a closing direction, a piston disposed at the valve rod, and a piston driving unit which drives the piston, and the piston is disposed at an upper end portion of the valve rod such that a piston upper end portion is exposed from an opening of the casing when the valve rod is located at an upper position, the piston being used as a moving member which abuts against the limit switch.

6. A flow rate control apparatus, comprising:
a body in which a required fluid passage is formed, a control valve, a sensor, and a selector valve with a limit switch, attached to the body, a first orifice disposed at an outlet passage from the control valve, a second orifice disposed at an outlet passage from the selector valve, and a control unit which controls a flow rate, the flow rate being controlled at the first orifice when the selector valve is closed, and the flow rate being controlled at the second orifice when the selector valve is opened,
wherein the selector valve with the limit switch is the fluid control device according to claim 2 which is disposed between the control valve and the orifice.

7. A flow rate control apparatus, comprising:
a body in which a required fluid passage is formed, a control valve, a sensor, and a selector valve with a limit switch, attached to the body, a first orifice disposed at an outlet passage from the control valve, a second orifice disposed at an outlet passage from the selector valve, and a control unit which controls a flow rate, the flow rate being controlled at the first orifice when the selector valve is closed, and the flow rate being controlled at the second orifice when the selector valve is opened,
wherein the selector valve with the limit switch is the fluid control device according to claim 3 which is disposed between the control valve and the orifice.

8. A flow rate control apparatus, comprising:
a body in which a required fluid passage is formed, a control valve, a sensor, and a selector valve with a limit switch, attached to the body, a first orifice disposed at an outlet passage from the control valve, a second orifice disposed at an outlet passage from the selector valve, and a control unit which controls a flow rate, the flow rate being controlled at the first orifice when the selector valve is closed, and the flow rate being controlled at the second orifice when the selector valve is opened,
wherein the selector valve with the limit switch is the fluid control device according to claim 5 which is disposed between the control valve and the orifice.

\* \* \* \* \*